United States Patent [19]

Yoshikawa et al.

[11] 4,076,567

[45] Feb. 28, 1978

[54] METHOD OF PRODUCING PLASTIC SHEETS WITH INTEGRATED GEOMETRIC DECORATIVE PATTERNS

[75] Inventors: Yoshinobu Yoshikawa, Suita; Kosuke Iida, Himeji; Tadayuki Morikawa, Hyogo; Akinori Satomi, Himeji, all of Japan

[73] Assignee: Takiron Co., Ltd., Osaka, Japan

[21] Appl. No.: 639,021

[22] Filed: Dec. 9, 1975

[30] Foreign Application Priority Data

Dec. 28, 1974 Japan .................... 50-149154

[51] Int. Cl.² .................... B29C 27/02; B29B 1/02
[52] U.S. Cl. .................... 156/219; 156/306; 427/282; 264/115; 264/119; 264/126; 264/346; 427/195; 427/197; 427/201; 427/203; 427/264
[58] Field of Search ............ 156/62.2, 278, 280, 156/283, 298, 299, 308, 324, 284, 306, 220, 219; 264/126, 6, 122, 115, 119, 346; 427/282, 189, 197, 201, 195, 203, 198, 264; 428/142; 118/406; 101/129

[56] References Cited

U.S. PATENT DOCUMENTS

| | | | |
|---|---|---|---|
| 3,194,859 | 7/1965 | Wacker | 264/122 |
| 3,400,035 | 9/1968 | Haig | 428/142 |
| 3,461,016 | 8/1969 | Irving et al. | 156/62.2 |
| 3,476,045 | 11/1969 | Lusher | 101/129 |
| 3,613,635 | 10/1971 | Brehm | 118/406 |
| 3,835,212 | 9/1974 | Piacente | 264/126 |
| 3,896,196 | 7/1975 | Dickey et al. | 264/6 |
| 3,951,714 | 4/1976 | Franco | 427/282 |

Primary Examiner—Charles E. Van Horn
Assistant Examiner—Jerome W. Massie
Attorney, Agent, or Firm—Sughrue, Rothwell, Mion, Zinn and Macpeak

[57] ABSTRACT

A method and apparatus for producing synthetic resin sheets having geometric decorative patterns extending through the thickness of the sheet as a substantially identical pattern image corresponding to the image portions of the exposed surfaces thereof, wherein differently colored resin particles are selectively introduced into individual pattern spaces which are confined by enclosing members on a support to provide a regular pattern of differently colored resin particle masses over the surface of the support in a regular pattern, the differently colored resin particle masses are then converted into a pre-formed sheet on the support, the regular color pattern still being retained, and the resulting assembly then being heated at a temperature sufficient to cause fusion or sintering together of the masses of differently colored resin particles comprising the sheet, wherein the original differently colored resin particle masses exist as a repeating pattern of differently colored areas which extend through the thickness of the sheet.

19 Claims, 14 Drawing Figures

METHOD OF PRODUCING PLASTIC SHEETS WITH INTEGRATED GEOMETRIC DECORATIVE PATTERNS

BACKGROUND OF THE INVENTION

1. Field of the Invention

This invention relates to a method and apparatus for producing synthetic resin sheets with decorative designs and, more particularly, to an improved method for producing synthetic resin sheets incorporating geometric (or regular, as these terms are used interchangeably herein to define a repeating pattern) pattern elements with the pattern image extending throughout the thickness of the resin sheet and comprising the corresponding image portions of the exposed surfaces of the sheet.

2. Description of the prior art

Heretofore, various methods of producing resin sheets having decorative designs have been developed and employed. Examples of methods of producing resin sheets having irregular decorative designs are extrusion methods, calender roll methods and pressing methods.

One of the most popular methods for producing resin sheets having regular decorative designs has included depositing fine particles (of a size of about 2 to about 300 $\mu$) of a resin composition on a continuously moving conveyer belt, heating the resin particles to cause a partial welding or fusion together of the individual particles and to form a pre-formed mass having the desired sheet configuration, producing printed geometric patterns on the surface of the pre-formed sheet by means of a suitable printing machine, and applying heat and pressure to the printed pre-formed sheet in a press to form a completely welded, uniform, non-porous sheet structure. This process is hereinafter referred to as the sintering method.

Examples of prior art wherein decorative designs are formed using such a printing apparatus include those disclosed in U.S. Pat. Nos. 3,359,352, 3,574,659, etc.

In another prior art method generally employed, various colored masses of resin particles, generally of a size of approximately 100 $\mu$ to 2 mm, are deposited in intended compartments defined by a set of mold frames constructed and assembled on a base member and then they are fused and pressed into an integral design sheet. This process is hereinafter referred to as the mold frame method.

The sintering method described above has been used only for the production of relatively thin plastic sheets having regular decorative designs, as it involves the use of a printing apparatus and only a paste or very fine particles (of a size of about 2 $\mu$ or less) can be used as a printing ink, so that when printing relatively thick sintered porous masses the ink cannot extend over the bottom of the porous masses in a sufficient amount.

Further, when plastic sheets having decorative designs are vertically cut with respect to the surface thereof, the border line of any cut which is between one decorative unit design and another decorative unit design does not appear as a clean straight line extending from the surface to the back side of the sheet. As a result, if a decorative design on the surface of the plastic sheet wears away, it is impossible to retain a semblance of a decorative design the same as that carried on the surface.

Furthermore, in the sintering method described above it is difficult to control the amount of printing ink applied, and powder having as small a particle size as possible is used to form a pre-formed mass (the stage immediately prior to plastic sheet formation) so that particles in the sintered pre-formed mass can effectively absorb printing ink. From this it follows that relatively thick plastic sheets having regular decorative designs cannot be obtained as a final sheet products.

In addition, when plastic sheets have regular pattern elements where the pattern image extends through the thickness of the plastic sheet, any one decorative design unit in the plastic sheet which is obtained by the sintering method described above will not have uniform color extending from the surface to the back thereof.

Also, with the mold frame method described above, a number of problems arise, including smearing due to shifting or sliding of the pattern forming particles used therein during the heat-pressing operation, and variations in the wall thickness of the final sheet product.

SUMMARY OF THE INVENTION

A primary object of the invention is to provide a method and apparatus for producing resin sheets having geometric patterns which extend identically throughout the thickness of the sheet which enables the production of such resin sheets with large thicknesses, without encountering any smearing of the patterns.

Another object of the invention is to provide a method wherein geometric patterns in resin sheets can be produced more economically by using a plurality of pattern screens corresponding in number to the number of different colors and shades of the same colors desired in the patterns.

A further object of this invention is to provide an improved method which is readily adapted to produce resin sheets with geometric patterns extending throughout the thickness of the sheet and providing an improved distinctive and attractive appearance resulting from the color arrangement of the resin particles contained in each pattern.

A still further object of this invention is to provide an apparatus which effectively prevents the pattern masses from sliding or deforming before they are fused together to form a sintered sheet product.

Accordingly, an object of this invention is to overcome the above-described problems associated with the prior art sintering and mold frame processes and to provide an improved method and apparatus for producing resin sheets having decorative geometric patterns extending throughout the thickness of the sheets, which insures the dimensional stability of the patterns, as well as their capability of reproducing original patterns after abrasion of the resin sheets, after prolonged times under severe environmental conditions, and provides more economical pattern production.

Broadly, in one embodiment the present invention provides a method which comprises the steps of selectively depositing resin particles of a first desired color or colors onto a support, e.g., a conveyor belt, through a pattern frame or screen which defines a hollow space of the desired pattern image with the top of the support, e.g., conveyor belt, and a guide member extending downward from the bottom of the pattern screen; levelling the resin particles of the first desired color or colors in the pattern space; removing the pattern screen; moving the formed pattern mass of the resin particles of the first desired color or colors on the support, e.g., conveyor, to the next pattern forming station; selectively depositing resin particles of a second desired color or colors onto the support e.g., conveyor belt, at desired areas which do not contain the resin particles of the first color or colors, through a second pattern screen to form a second pattern mass of the second resin particles; levelling as above; removing the second pattern screen; moving the support having thereon the previously formed pattern masses in succession to the desired number of additional pattern forming stations and repeating the pattern forming procedures as described above at each pattern forming station; whereby a complete pre-formed sheet assembly including the desired number of colored pattern masses therein is formed.

In a further embodiment of the process of this invention, the pre-formed sheet structure comprising the pattern forming masses of resin particles is carried by a support into a heated oven wherein the resin particles in the sheet structure are fused and welded together while exposed to the surrounding atmosphere to form a unitary fused or sintered resin sheet product. The sintered resin sheet is then treated with embossing rolls or an embossing press to form depressions with an image corresponding to the desired geometric pattern image and, of course, to the pre-formed pattern masses (though, if desired, embossing rolls or an embossing press capable of forming depressions, the image of which does not correspond to the desired geometric pattern image can also be employed). Thereafter, the sheet is annealed and then cooled and a continuous length of resin sheet having integrated geometric patterns therein is thus obtained.

Further, in accordance with the invention there is provided an apparatus which comprises a support or conveyor means; a series of pattern screens disposed above the path of travel of the conveyor means, each of the pattern screens including a cover sheet having at least a single contoured pattern opening corresponding in outline configuration to a pattern to be produced in the final sheet product; a guide member extending downward from the periphery of the pattern opening, which periphery is preferably curved of arcuate, and adapted to confine a corresponding outlined pattern space on the surface of the conveyor means, means for moving the assembly of the cover sheet and the guide member in the vertical direction toward and away from the conveyor means; and a heating means for heating a pre-formed sheet assembly produced on the conveyor means, after the conveyor means has passed beneath the series of pattern screens, to produce a sintered final sheet product having integrated geometric patterns extending in the desired identical pattern image throughout the thickness of the sheet product.

DETAILED DESCRIPTION OF THE INVENTION

The number of pattern screens used in the process of this invention corresponds to the number of pattern masses providing different colors and shades of the same color desired in the finished sheet product. The wall-thickness of the sheet structure to be formed in this manner depends on the vertical extent or height of the guide member connected to the bottom of the pattern screen which serves to confine the outline of the configuration of the pattern mass.

Accordingly, by using guide members with a different vertical extent or height which confine the wall-thickness of the pre-formed sheet structure, it is possible to produce a resin sheet with geometric patterns extending throughout the thickness of the sheet in the desired wall thickness.

Each of the pattern screens includes a top cover sheet or shield which prevents the pattern forming resin particles supplied in the corresponding pattern formation stage from entering unwanted sections of the sheet structure to be formed on the conveyor means, and this feature enables resin sheets having integrated geometric patterns to be produced in any desired wall thickness by varying the height in the vertical direction of the downwardly extending guide member joined at the top to the periphery of the contoured pattern opening of the cover sheet accordingly.

As described hereinbefore, it was very difficult by prior art methods to produce relatively thick-walled resin sheets having geometric decorative patterns extending in a substantially identical pattern image throughout the thickness of the sheet, and because of the insufficient wall thickness, the resin sheets produced by prior art methods were subject to relatively rapid wear which caused destruction of the patterns and occasionally complete loss of the pattern forming material, resulting in a non-patterned plain sheet.

In contrast, in accordance with the present invention, geometric decorative patterns can be produced which have a sufficient wall-thickness to retain the desired pattern image, notwithstanding the wear of the resin sheet.

When resin sheets having geometric patterns extending throughout the thickness thereof were produced with relatively large wall thickness using prior art techniques, a smearing of the differently-colored patterns in the sheet generally occured.

Thus, in accordance with a further aspect of the invention, the guide members connected to the peripheries of the pattern openings of the pattern screens are disposed at an inclined angle with respect to a plane normal or perpendicular to the support so that when the pattern forming masses of differently-colored resin particles are deposited in their respective pattern spaces, they will be joined with adjacent pattern spaces at a corresponding inclined juncture, thereby reducing the possibility of pattern deformation or destruction when the guide members are removed and also during the time in which a subsequent pattern forming operation takes place.

In producing patterns which are completely encircled by previously formed pattern sections, it is possible to use a pattern screen without any guide members, thereby permitting the pattern forming resin particles deposited on the corresponding pattern spaces to directly combine with the adjacent differently-colored resin particle masses.

With this arrangement, any smearing problems with respect to the individual patterns are substantially eliminated.

Generally, the resin particles are provided in the hollow spaces of the desired pattern image using leveling means, which also assists to compact the resin particles in the pattern space, e.g., two spatulas or squeegees (these terms are generally used interchangably) which extend vertically with respect to the direction of movement of the support, usually a conveyor, and which are attached to a supporting member. The supporting member is usually movably connected to a shaft which permits the spatulas or sequeegees to be lowered to the pattern screen, with the shaft being fixed at the ends thereof to the frame of the resin sheet production apparatus.

A hopper for supplying the resin particles is generally supported in such a position that the spatulas or squeegees are positioned in the outlet of the hopper cooperating with the spatulas movably suspended from the shaft so that the hopper and the spatulas can move on the screen frame in a vertical direction with respect to the direction of movement of the conveyor belt.

Usually the spatulas or squeegees are in contact with the pattern screen while they move back and forth over the width of the conveyor belt and thus assist to fill and compact the pattern space with the resin particles supplied from the hopper, simultaneously making the height of the resin particles over the pattern screen even.

In one embodiment of the present invention, where the width of the decorative resin sheet to be produced is somewhat smaller than that of the conveyor belt, and the pattern opening is confined by a cover or shield of a frame-like form at the inner peripheries of the pattern screen so as to adjust the width of the pattern opening to coinside with a desired width of the resin sheet to be produced, the spatulas or squeegees do not have to move between outer peripheries of the pattern screen, but it is sufficient that they move between the outer peripheries of the pattern opening, while they move back and forth in the direction perpendicular to that of movement of the conveyor belt.

The length of the spatulas or squeegees, usually, is as large as the length of the pattern screen measured in the direction of movement of the conveyor, or, alternatively, it is as large as the length of the pattern opening measured between their outer peripheries of the pattern opening, when the pattern screen is covered at the peripheries thereof with the cover or shield of a frame-like form.

In order to further compact the pattern space, both spatulas or squeegees can be used during return strokes, for example, the spatulas or squeegees can be provided in such a manner that the resin particles supplied by the hopper are present therebetween and, as a result, during the forward movement of the cooperating spatulas and the hopper the rear spatula (with respect to the direction of movement of the hopper) comes into contact with the pattern screen to thereby assist in filling and compacting the pattern space with the resin particles supplied to the front of the rear spatula or squeegee by the hopper.

On the return stroke or movement of the hopper, the situation is reversed, i.e., the other spatula or squeegee serves to assist in filling or compacting the pattern space with the resin particles.

The above system can be operated pneumatically using an air-cylinder apparatus using air supplied by an air-compressor.

As described above, leveling means such as a spatula or squeegee is especially preferred to fill the pattern space with the resin particles in this invention.

Also, in accordance with the invention, the pattern forming resin particles are rendered adhesive by adding a wetting agent to the particles. For example, a blend oil can be mixed with the particles prior to supply of the particles to the pattern spaces.

The resin particles are preferably those having sharp edges to enhance the dimensional stability of the pattern forming masses in the pre-formed sheet structure prior to fusion. Sharp edges of adjacent particles in the sheet structure tend to firmly bind together and thus prevent sliding and slipping of the particles in the pattern masses. From this standpoint, a preferred particle form is one obtained using a pulverizer including sharp cutter blades, although other means can be employed to prepare particles provided that the particles prepared have an outline configuration which enables the masses of the particles to retain the shape of the sheet structure in a reliable and stable manner. For example, polyhedral or crumb-like resin particles are most preferred. Particles of such a form can be produced by stirring the resin particles using a crush mixer while elevating the temperature up to about 120°–130° C to soften and melt the resin particles and then adding water to lower the temperature, followed by stirring to obtain the desired crumb-like particles.

The preferred particle size is less than about 4 mm in diameter down to the size of an ordinary powder.

Further, the resin particles used in the present invention most preferably have a size of about 2 $\mu$ to about 4 mm (longest dimension), though one skilled in the art will appreciate that somewhat smaller and substantially larger particles can be used with some loss of benefits.

The following example of a preferred embodiment of the method in accordance with the invention for producing a resin sheet having geometric decorative patterns is given to illustrate the invention more specifically.

EXAMPLE

A dry blend having the following composition was extruded and then cut using a shearing pulverizer into particles passing through the openings of a 20 mesh screen (ca. 1.2 mm).

| Component | Parts by Weight |
| --- | --- |
| Polyvinyl Chloride | 100 |
| Plasticizer (DOP, DAP, DBP, etc.) | 60 |
| Filler (calcium carbonate: 100 parts, sirasu baloon[*] 100 parts) | 200 |
| Stabilizer (lead stearate, barium stearate, dibutyl tin maleate, etc.) | 3.0 |
| Pigment (red, yellow, blue, green, etc., corresponding to the individual color areas desired in the patterns) | Slight |
| Lubricant | Slight |
| Blowing Agent (e.g., nitrogen type, such as azodicarbonamide; added, if desired) | 1.0 |

[*]"Sirasu baloon" is composed of very fine hollow glass balls or spheres produced by baking at about 1,000° C fine particles of volcano eruption called "sirasu".

The resulting resin particles were then added to a paste resin (commercially available product called "Zeon 135J" produced by Nippon Zeon Co., Ltd.; containing paste resin particles of a 200 mesh pass size (ca. 120 μ) in a proportion of 20 parts by weight of the paste resin to 100 parts by weight of the particles, 15 parts of a plasticizer and 0.5 part of a stabilizer to produce a resin particle mixture (hereinafter this term shall be used to denote such a mixture of a paste resin and the colored resin particles), wherein the individual resin particles were each surrounded by a uniformly distributed plastic paste covering so that each particle could move or flow smoothly with respect to adjacent particles.

It is preferred, but not mandatory, to use such a resin particle mixture in the present invention.

While the above-described material composition is preferred in the practice of this embodiment of the method of the present invention, it is to be understood that the types and proportions of the additives can be varied while keeping the requisite properties and characteristics of the resin particles for the process of the invention. Also, various types of resinous polymers can be employed instead of polyvinyl chloride such as polyvinyl acetate, polyvinyl fluoride polymers, a mixture thereof, a copolymer of monomers of such polymers with another monomer, polyethylene, polypropylene and butadienestyrene copolymer, etc.

It should be noted that differently colored particle mixtures can be prepared in a number corresponding to the number of the different colors and shades of the same color desired in the patterns to be produced in the resin sheet.

In this example, four differently colored resin particle mixtures were employed.

A blend oil, such as polybutene, was then added as the wetting agent to each of the resin particle mixtures in a proportion of 4 parts by weight of the wetting agent to 100 parts by weight of the resin particle mixture in order to render the individual particles adhesive to assure retention of the shape of the pattern masses in the pre-formed sheet.

The amount of the blend oil to be added to the resin particle mixtures is selected such that the pre-formed sheet structure will not adhere to the pattern screen to an extent such that it is difficult to remove the screen after formation of the patterns from the sheet structure, yet sufficient adhesion is acheived between the individual particles to maintain the sheet structure in the desired configuration.

Typically, it is preferred for the wetting agent, e.g., blend oil to be added in a proportion of about 2.0 to 7.0 parts by weight to 100 parts by weight of the resin particle mixture.

It is to be understood that liquids other than polybutene can be employed to provide the above wetting effect. For example, water or an aqueous solution of a conventional wetting agent can be employed instead of the blend oil.

The manufacturing operation in accordance with a preferred embodiment of the invention will now be described in greater detail by reference to the accompanying drawings.

Figure 1:
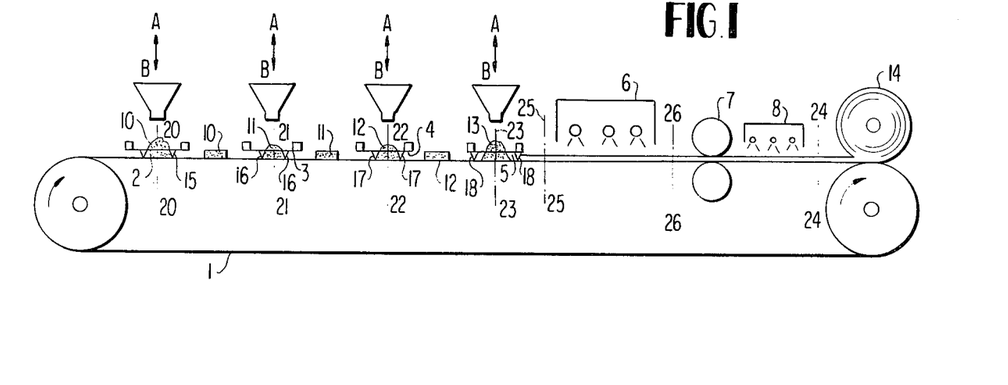
FIG. 1 schematically illustrates a longitudinal cross sectional view showing a preferred form of the apparatus in accordance with the invention for producing a pre-formed sheet structure and then a final sheet product with integrated geometric patterns.
Figure 2:
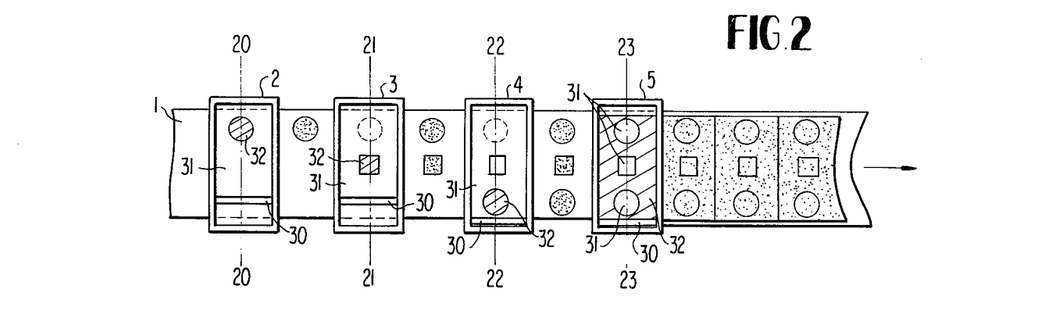
FIG. 2 is a fragmentary top plan view showing, on an enlarged scale, the manner of producing a pre-formed sheet structure on the apparatus of FIG. 1.

Referring to the drawings, particularly to FIGS. 1 and 2 a conveyor belt 1, e.g., of glass fiber reinforced polytetrafluoroethylene, is shown, on the top of which is deposited an appropriate amount of the desired colored resin particle mixture 10 from a hopper through a pattern screen 2, and the mixture is levelled by two strokes of spatula 30 (in FIG. 2 only one spatula is shown and another spatula is not shown for simplicity) across the width of the screen 2 so that the resin particles fill the pattern space defined beneath the pattern opening 32 of the screen 2 and is compacted therein. The resin particle mxiture can be deposited directly on the conveyor belt, or, alternatively, it can be deposited on a synthetic resin sheet carried on the conveyor belt.

The cover sheet or shield 31 of the screen 2 (other than at the pattern opening) is covered with a non-perforated sheet or plate, preferably of plastic, 35. In this embodiment, pattern opening 32 is covered with a metallic wire cloth or network having an opening size of 5 mesh, although it is understood that the mesh size of the wire cloth or network extending across the pattern opening is not so restricted and any mesh size can be employed, provided that it permits the resin particles or resin particle mixture to pass through the wire mesh openings freely, thus avoiding clogging.

During the process, the pattern screen 2 is moved and maintained in the lowermost position of the pattern screen, as indicated by the arrow B in FIG. 1, wherein a guide member 15 connected to the periphery of the pattern opening 32 and extending downward from the bottom of the screen (in this example the pattern opening 32 and therefore the guide member are circularly shaped and such can be considered a guide ring; this shape is not mandatory, of course) is contacted at its bottom with the surface of the belt 1.

Figure 3:
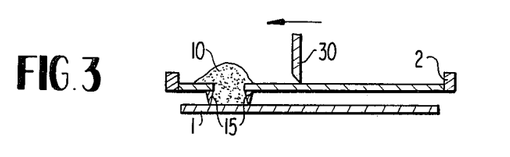
FIG. 3 is a cross sectional view taken along line 20—20 of FIG. 1.

The mass of the resin particle mixture 10 is deposited in the contoured pattern space defined by the belt 1, the pattern screen 2 and the guide member 15, as shown in FIG. 3. In an alternative form, a plurality of spaced metallic wires extending transversely parallel to the direction of movement of the spatula 30 can be used instead of the metallic screen 32.

In producing certain types of pattern configurations, it is possible to use a thin-walled cover sheet or shield without any means to span or cover the pattern openings.

The guide member can have various forms as designated at 15, 16, 17 and 18 in the drawings, which are each illustrated as being connected to the periphery of the pattern opening of the pattern screen, and in this example they are formed of a natural or synthetic resinous material, although it should be noted that the material for the guide member is not so restricted and any other material can be employed which provides sufficient physical strength for the guide member to retain the pattern configuration. For example, natural or synthetic rubbers, or metals such as brass, can be particularly conveniently employed, because guide members of brass can be easily connected to the screen plate, e.g., by soldering, or because rubber maintains the resin particles appropriately compressed during the levelling operation using the spatula, thus reducing the possibility of a deformation of the shaped pattern mass.

It will be obvious to one skilled in the art that while the guide members are generally joined to the outer periphery of the pattern opening, they can be joined to the inner periphery of the cover sheet to provide a substantially equivalent effect.

Figure 8:
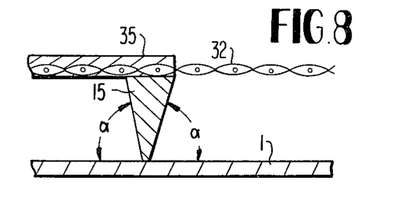
FIGS. 8, 9, 10 and 11 are fragmentary or complete transverse cross sectional views, on an enlarged scale, showing various types of guide members and also arrangements thereof.

A typical form of the guide member, illustrated in cross section in FIG. 8, is connected to the pattern plate such that the guide member is inclined at an angle of 75°, designated by ($\alpha$), with respect to the plane of the surface of the conveyor belt 1.

The vertical height of the guide member is slightly greater than the final desired thickness of the sheet product. In this example, the guide member provides a vertical height of 4 mm. It should be noted that the inclined angle of the guide member can be increased while keeping the desired feature of preventing the pre-formed mass of the pattern of resin particles from deformation after removal of the guide member.

The optimum angle can be determined experimentally as a steady heap angle, i.e., the particle heap does not lose its shape and thus its boundaries are maintained, even when the guide member is removed, the angle being determined with reference to the angle of repose. Thus, when the resin particles are deposited onto a flat plate at a fixed supply position without using any guide member confining the deposited resin particle mass at a steady heap angle heap, integrity is retained. This angle will vary depending upon the material, the size and the shape of the particles used.

It has been found that the preferred range of the inclined angle ($\alpha$) of the guide members can range from about 60° to 85°, and the angle increases within this range as the amount of wetting agent, e.g., blend oil, added to the resin particles is increased, and also increases as the resin particle size increases.

Figure 9:
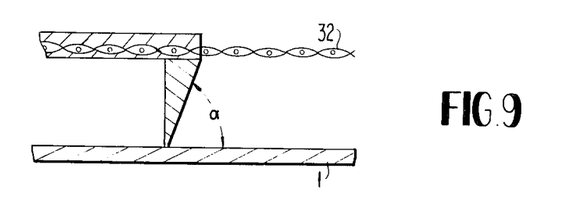

In another form illustrated in FIG. 9, the cross sectional configuration of the guide member is such that only the inner surface adapted to contact the resin particle mass deposited in the pattern space is inclined at an angle ($\alpha$), and the opposite outer surface extends vertically.

Figure 10:
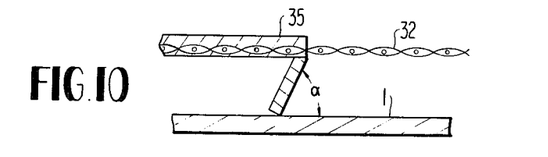

In a further form illustrated in FIG. 10, the guide member has a rectangular or flat sided cross section and is connected to the screen plate 35 at the desired inclined angle.

Figure 11:
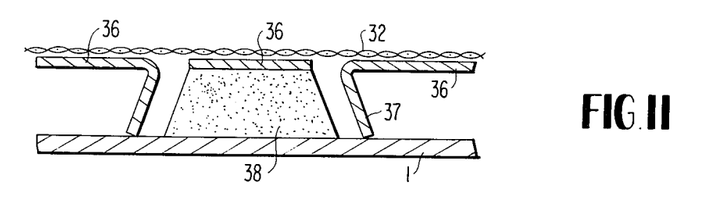
Figure 12:
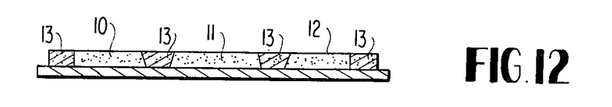
FIG. 12 is a transverse cross sectional view taken along line 26—26 of FIG. 1, showing the pre-formed structure as the structure leaves the heated oven 6.
Figure 13:
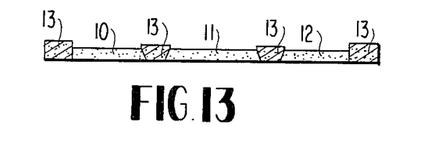
FIG. 13 is a transverse cross sectional view taken along line 24—24 of FIG. 1, showing the final sheet product prior to winding.
Figure 14:
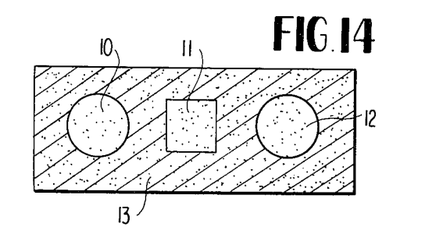
FIG. 14 is a plan view showing a portion of the final resin sheet product having geometric patterns extending through the thickness of the sheet and comprising corresponding pattern portion of the exposed opposite surfaces of the sheet.

In still another form illustrated in FIG. 11, the guide member is integrally formed with the cover sheet 36 as a bend flap 37, and the pattern opening 32 thus formed in the cover sheet 36 is covered with a wire mesh screen, although the wire mesh screen can be omitted in the case of relatively simple pattern configurations, such as the illustrated circular pattern.

In the next step, the pattern screen 2 is lifted in the direction of arrow A and the conveyor belt 1 is advanced to a position wherein the pre-formed resin particle mixture mass 10 is located between the pattern screen 2 and the next pattern screen 3. At this point the pattern screen 2 is lowered in the direction of arrow B and the above procedure is repeated to add fresh resin particle mixture in the pattern space of the screen 2.

Simultaneously with the upward and downward movement of the pattern screen 2, the next pattern screen 3 and the successive remaining pattern screens 4 and 5 can also be lifted and lowered in unison.

Figure 4:
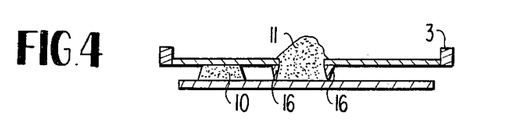
FIGS. 4, 5 and 6 are cross sectional views taken along lines 21—21, 22—22, and 23—23, respectively, in FIG. 2.

Since all pattern screens are then lifted in the direction of arrow A, and the pre-formed mass thus formed in the first pattern forming station is moved from beneath the pattern screen 2 to a position between the pattern screens 2 and 3, the proceeding pre-formed mass formed in the same pattern forming station in the previous step is moved beneath the pattern screen 3, wherein a different-colored resin particle mixture 11 is deposited to form a second pre-formed pattern, as shown in FIG. 4, in a manner similar to that described with respect to the first described pre-formed mass.

Figure 5:
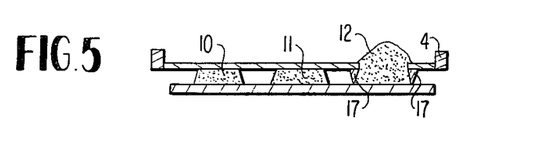
Figure 6:
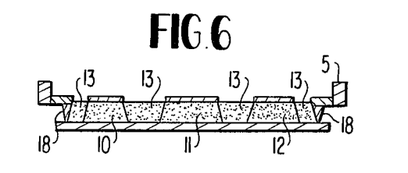

Subsequently, the conveyor belt 1 is intermittently advanced beneath the screen pattern 4 whereby a third pattern is pre-formed, as shown in FIG. 5, and then beneath the screen pattern 5 to add a fourth pattern, as shown in FIG. 6. The conveyor belt 1 is intermittently moved to successive pattern forming stations provided by the pattern screens 2, 3, 4 and 5, and during such operations all the pattern screens are moved upward and downward in unison with respect to the conveyor belt 1 as it is positioned beneath the pattern screens. The resin particle mixtures 10, 11, 12 and 13 are deposited simultaneously on the individual pattern spaces defined by the conveyor belt 1 and the pattern screens to form pre-formed masses of different colors corresponding in number to the number of the pattern screens.

While in the preferred embodiment the spaced intervals between adjacent pattern screens 2, 3, 4 and 5 are twice the spacing between the same colored adjacent patterns formed on the conveyor belt, it should be understood that the series of pattern screens can be arranged with a spacing corresponding to a multiple of the spacing between the same colored adjacent patterns by a factor greater than twice the spacing.

As previously described, one of the most important features of the invention is that a relatively large walled resin sheet having geometric decorative patterns can be produced in a reliable manner without smearing or deformation of the geometric patterns in the sheet occurring, and this is accomplished by providing inclined walls on the guide members 15, 16, 17 and 18 connected to the pattern screens 2, 3, 4 and 5, respectively, and also by adding a wetting agent, e.g., a blend oil, to the pattern forming resin particles to be deposited within the guide members.

As earlier indicated, in one embodiment of the invention the distance which one pattern-depositing movement of the conveyor belt involves is smaller than the width of each pattern screen in the direction of movement of the conveyor and the ratio of the distance between the center lines of two adjacent pattern screens to the distance of one pattern depositing movement of the conveyor is determined to be an integer such as 2 or more. As an example of this embodiment of the invention, with one movement of the conveyor belt only a portion of the pre-formed pattern mass to be formed is formed in the pattern screen 2, which portion moves so that it is positioned between the pattern screens 2 and 3. With the next movement of the conveyor belt the thus-formed portion of the pre-formed mass comes between the center lines of the pattern screens 2 and 3, and another portion of the mass is added and which then moves with a third movement of the conveyor belt to a position just under the pattern screen 3. The same procedure is repeated until the portion reaches a position just under pattern screen 5, where the pre-formed pattern mass is completed.

Generally, when the proportion of the distance between the center lines of two adjacent pattern screens is 3, 4 and so on, it is necessary, for the pre-formed pattern mass to be completed, to move from one pattern screen to another with 3, 4, and so on, movements of the conveyor belt.

Figure 7:
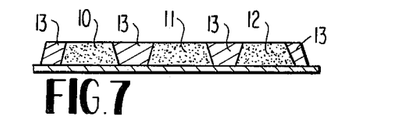
FIG. 7 is a transverse cross sectional view taken along line 25—25 of FIG. 1, showing the pre-formed structure immediately before the pre-formed structure enters the heated oven.

In a further step of the manufacturing process, the pre-formed sheet assembly shown in FIG. 7 is carried by the conveyor belt 1 into a heated oven 6 wherein the sheet assembly is heated at about 200° C for 5 minutes to provide a fused or sintered sheet product. In this example, where the thickness of the sheet is 2.5 mm, a suitable temperature and time range which can be employed is ca. 170° – 250° C and ca. 3 – 10 minutes, respectively.

In the case of sheets having greater or lesser thicknesses, the temperature and/or time are appropriately adjusted to obtain a fused or sintered product without resin degradation, for example, with a sheet having a thickness greater than that of this example, e.g., 10 mm, a suitable time is about 15 minutes. This factor is not overly critical so long as fusion or sintering is attained and the resin is not degraded or decomposed so as to lose its physical properties.

The sheet product is then passed through an embossing press 7 or between embossing rolls to form depressions corresponding in outline configuration to the pattern image, usually under a pressure of about 10 to 20 kg/cm$^2$, preferably at 10 kg/cm$^2$ at 70° – 80° C. The embossed sheet is then subjected to an annealing step 8, air-cooled and taken up as a coiled package of continuous elongated sheet product 14.

If desired, a roll leveller can be provided immediately prior to the heating step in the heated oven 6, for levelling the top of the pre-formed sheet assembly.

In this example, the final sheet product having a geometric design extending through the thickness thereof has a thickness of 2.5 mm, with peferred thickness ranging from about 2.5 mm to up to about 10 mm.

Referring to FIG. 2 in somewhat greater detail, the width of the pattern screen, i.e., 5, in the direction of movement of the conveyor is made somewhat larger than the length of the conveyor portions which are fed during one stroke of the spatulas or squeegees (this dimensional condition can also be applied to the other pattern screens 2, 3 and 4). On the other hand, any two adjacent pattern screens are so positioned that the distance between their respective center lines is twice as large as the length of the conveyor portions fed during any one stroke of the spatulas or squeegees in one embodiment of the present invention. Thus, the boundary line portion between the pattern screen 5 and the adjacent unit design form positioned on the side of the oven 6 lies inside the contour of the pattern screen 5 (at the outer periphery of the pattern opening 32 when the pattern screen 5 is covered at the peripheries thereof with the cover or shield 31 of a frame-like form), so that when depositing a resin particle mixture in the pattern screen 5, the pre-formed pattern mass formed inside the pattern screen 5 and the adjacent unit design form are in contact with each other through a guide member, which usually is thin. Upon the removal of the guide member with the pattern screen, the pre-formed pattern mass and the adjacent unit design form almost contact each other. If desired, means for leveling the pre-formed mass such as rollers may be provided immediately prior to the heated oven 6. Upon further sintering by passage through a heated oven followed by embossing-pressing, there is obtained a completely continuous elongated sheet product 14.

In accordance with the present invention, resin sheets having geometric decorative patterns can be produced with an increased wall thickness as compared to the sheets of this type produced by prior art methods, and the increased wall thickness can be, for example, on the order of 1 to 5 mm or more.

It is noted that the vertical thickness of the preformed sheet structure prior to sintering and pressing varies with the apparent specific gravity of the pre-formed sheet structure but typically 150% of the wall thickness of the final sheet product is preferred, with values of generally about 130 to about 300% of the pre-form patterned mass being used.

While in the preferred embodiment the pre-formed sheet structure is directly provided on the surface of the conveyor belt 1, it is to be understood that a suitable backing material, such as asbestos paper, glass fiber sheets, polyvinyl chloride sheets, or other sheet materials, can be mounted on the conveyor belt with or without application of an adhesive, such as a plastisol or hot-melt adhesive, to provide a backing strip on the completed sheet product.

It is also possible for a transparent resin coating, such as a plastisol, acrylic coating material, copolymers of vinyl chloride and vinyl acetate, copolymers of vinyl chloride and methyl methacrylate, copolymers of vinyl chloride and vinylidene chloride, copolymers of vinyl chloride and urethane resin, etc., to be provided on the surface of the final sheet product to impart a more attractive appearance to the sheet in a conventional method, such as coating using a reverse roll, roll coater, atomizing, or the like. This improvement in appearance of the sheet can also be achieved according to a plastic film lamination process.

In the illustrated embodiment, four different colors were employed for the decorative patterns, wherein the red is provided by a pigment such as molybdenum, red iron oxide or Para Red; the yellow by zinc yellow, zinc chromate or benzidine yellow; the blue by cobalt blue or ultramarine blue and the green by chrome oxide green, although the number of colors used can be increased to provide a more complex variegated colored design by using more pattern screens.

From the foregoing, it will be readily apparent that the invention provides an improved method wherein relatively large walled resin sheets having geometric patterns extending through the thickness thereof can be produced economically while assuring sharpness or distinction in the geometric pattern outlines, and that because of the increased wall thickness and the integrated uniform pattern arrangement throughout the thickness of the sheet the sheets produced in accordance with the invention possess enhanced resistance to wear or destruction of the patterns when they are subjected to abrasive conditions.

Although the invention has been described in detail and with respect to a preferred embodiment thereof, it will be apparent to one skilled in the art that variations and modifications can be made therein without departing from the spirit and scope thereof.

For example, while the heretofore offered discussion as being in terms of using differently colored resin particles or differently colored resin particle mixtures at each pattern screen station, it will be apparent to one skilled in the art that where it is desired to form a final sheet product where a certain color repeats, one could, for example, with reference to FIG. 2, use resin particles or resin particle mixtures of the same color at two or more pattern screens, if desired, for instance, at pattern screens 2 and 4. Modifications of this concept will, it is believed, be apparent to one skilled in the art, and the present invention is meant to include the same.

Obviously, if desired, any one pattern screen can include two or more pattern openings in combination with guide members, though in this case extra case must be taken to insure uniform resin distribution to each pattern opening.

Further, while the term "different colors" or similar terminology has been widely used in the specification, it should be apparent to one skilled in the art that it is not mandatory that the actual spectral response of the resin particles differ in the sense of having different colors but, for example, resin particles or resin particle mixtures having the same color can be used so long as some additive is present therein which presents a different visual response, for example, one might wish to use the same color in each pattern screen but to utilize different compatible resin materials in each pattern screen so that the index of refraction of each geometric pattern is different, thereby obtaining a rather unique and pleasant final sheet product having the same "color" across the sheet but exhibiting different visual responses due to the differing indices of refraction of the different resin materials.

It should further be apparent to one skilled in the art that the color in anyone pattern need not be uniform, i.e., if desired, a striated or "marbled" pattern can be achieved in each pattern to provide still yet an additional type of unique visual pattern.

Finally, it should be clear to one skilled in the art that the term "different colors", of course, includes pattern areas which are transparent, translucent, semi-translucent or the like, which can be used in various combinations together or in combination with areas which are opaque or truely colored. An example of such would be a checkerboard pattern wherein certain squares are transparent and other squares are any desired color, for example, white or black.

Given the essential teaching of the present specification, it is believed that these and other modifications of the present invention will be apparent to one skilled in the art. In line with the essential concept which underlines the present invention, i.e., the provision of a method and an apparatus which enables one to select at will the visual responses of various pattern areas of a final sheet product which includes at least two differently colored areas and to insure that the visual response is uniformly exhibited through out the entire thickness (or wall thickness) of the final sheet product, whereby should the sheet product undergo abrasion nonetheless the visual responses constant in nature.

What is claimed is:

1. A method for producing resin sheets having geometric decorative patterns with individual patterns being substantially identical throughout the thickness thereof, which comprises depositing first colored resin particles into a pattern space defined by the surface of a support and a guide member extending downward from the bottom of a pattern screen and making an angle between 60° and 85° with the support; removing said guide member to leave a pre-formed pattern mass of said colored resin particles on said support; conveying intermittently with one or more movements said support having said pre-formed pattern mass thereon to a position such that said pre-formed pattern mass is below a subsequent pattern screen; depositing second colored resin particles into a second pattern space defined by said support and a guide member extending downward from said second pattern screen to form a second pre-formed pattern mass on said support; successively conveying said support having said pre-formed pattern masses thereon to subsequent additional pattern forming positions and repeating the steps for forming the resin particle pattern masses to produce a pre-formed sheet assembly comprising the desired number of separately formed pattern masses of colored resin particles; and heating the resulting pre-formed sheet assembly to sinter the resin particle masses in the sheet assembly, thereby producing a fused, integral sheet product having colored patterns extending in a substantially identical pattern configuration throughout the thickness of said sheet at least two of said colored patterns differing in color.

2. The method as claimed in claim 1, wherein the color of the resin particles applied during any one pattern mass formation differs from the color of the resin particles in any other pattern mass formation.

3. The method as claimed in claim 1, wherein said differently-colored resin particles are mixed with a wetting agent.

4. The method as claimed in claim 3, wherein said wetting agent is a blend oil.

5. The method as claimed in claim 1, wherein said differently-colored resin particles comprise particles with sharp edges.

6. The method as claimed in claim 2, wherein said differently-colored resin powders comprise particles with sharp edges.

7. The method as claimed in claim 3, wherein said differently-colored resin powders are sheared particles obtained from a pulverizer.

8. The method as claimed in claim 1, wherein the particle size of said differently-colored resin particles is less than about 4 mm.

9. The method as claimed in claim 1, wherein each of said differently-colored resin particles comprises a mixture of a polymer selected from the group including polyvinyl chloride, polyvinyl acetate, vinyl fluoride polymers, mixtures thereof, copolymers of monomers of such polymers with another monomer copolymerizable therewith, polyethylene, polypropylene and a butadiene-styrene copolymer and includes a colorant, a stabilizer, a plasticizer and a wetting agent.

10. The method as claimed in claim 9, wherein the wetting agent is a blend oil which is present in the proportion of about 2 to 7 parts by weight of the blend oil to 100 parts by weight of the mixture.

11. The method as claimed in claim 10, wherein the blend oil is polybutene.

12. The method as claimed in claim 1, including additionally embossing said fused sheet product in an image of the differently-colored patterns; annealing said embossed sheet product; cooling said annealled, embossed sheet and taking up said cooled product as a continuous sheet.

13. The method as claimed in claim 12, wherein the thickness of said pre-formed sheet assembly defined by said guide member is on the order of about 130 to about 300% the final desired thickness of the sheet.

14. The method as claimed in claim 12, including placing a backing material on the surface of the support to provide a backing strip on the final sheet product.

15. The method as claimed in claim 14, wherein said backing material has an adhesive coating thereon to produce an adhesive bonding of said backing strip to the final sheet product 16. The method as claimed in claim 14, including additionally applying a transparent covering sheet to the surface of the final sheet product.

17. The method as claimed in claim 16, wherein the applying of said transparent covering sheet is by coating a layer of a plastic thereon.

18. The method as claimed in claim 16, wherein the applying of said transparent covering sheet is by laminating a plastic film thereon.

19. The process of claim 1, wherein after said resin particles have been deposited in said pattern surface, said deposited resin particles are made level by a levelling means.

* * * * *